(12) United States Patent
Noguchi

(10) Patent No.: US 8,503,810 B2
(45) Date of Patent: Aug. 6, 2013

(54) IMAGE COMPRESSION USING PARTIAL REGION DETERMINATION

(75) Inventor: Yukinori Noguchi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 130 days.

(21) Appl. No.: 12/896,255

(22) Filed: Oct. 1, 2010

(65) Prior Publication Data

US 2011/0052089 A1  Mar. 3, 2011

Related U.S. Application Data

(63) Continuation of application No. PCT/JP2009/001576, filed on Apr. 3, 2009.

(30) Foreign Application Priority Data

Apr. 4, 2008  (JP) .................................. 2008-97968

(51) Int. Cl.
*G06K 9/36* (2006.01)

(52) U.S. Cl.
USPC ....................................................... 382/250

(58) Field of Classification Search
None
See application file for complete search history.

(56) References Cited

U.S. PATENT DOCUMENTS

| 6,798,834 B1 | 9/2004 | Murakami et al. |
| 2006/0115168 A1 | 6/2006 | Kobayashi |
| 2007/0140569 A1 * | 6/2007 | Tabuchi et al. ................ 382/232 |

FOREIGN PATENT DOCUMENTS

| CN | 1922858 A | 2/2007 |
| JP | 63-78674 A | 4/1988 |
| JP | 4-354489 A | 12/1992 |
| JP | 6-30402 A | 2/1994 |
| JP | 07-222145 A | 8/1995 |
| JP | 7-322251 A | 12/1995 |
| JP | 10-178639 A | 6/1998 |
| JP | 2006-157481 A | 6/2006 |
| JP | 2006-262390 A | 9/2006 |

* cited by examiner

*Primary Examiner* — Nirav G Patel
(74) *Attorney, Agent, or Firm* — Birch, Stewart, Kolasch & Birch, LLP

(57) ABSTRACT

An image processing system that can reduce the amount of operations for compression processing includes a characteristic region detecting section that detects a characteristic region from an image and a compressing section that compresses the image by compressing each prescribed partial region. The compressing section compresses an image of a partial region included in a characteristic region by using pixel values of pixels, the number of which is larger than the number of pixels used for compressing an image of a partial region included in a region other than the characteristic region.

11 Claims, 8 Drawing Sheets

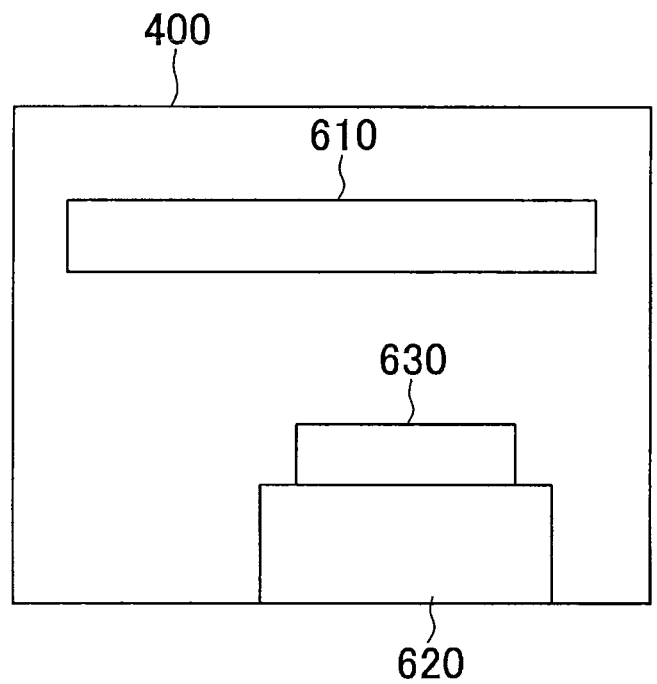
F I G . 6

IMAGE COMPRESSION USING PARTIAL REGION DETERMINATION

CROSS REFERENCE TO RELATED APPLICATIONS

This application is a Continuation of PCT International Application No. PCT/JP2009/001576 filed on Apr. 3, 2009, which claims priority under 35 U.S.C. 119(a) to Patent Application 2008-97968 filed in Japan, on Apr. 4, 2008. The entire contents of Patent Application 2008-97968 filed in Japan on Apr. 4, 2008 and Patent Application 2009-92410 filed in Japan, on Apr. 6, 2009 are hereby incorporated by reference into the present application.

BACKGROUND

1. Technical Field

The present invention relates to an image processing system, an image processing method, and a computer-readable medium.

2. Related Art

A method for resolution conversion of an image has been known (e.g., see Patent Document 1). The method includes reading high-resolution image-encoding data, entropy decoding the data, inverse quantizing the decoded data, performing a matrix operation of the inverse-quantized data and a resolution-conversion matrix that is generated from a discrete-cosine-transform matrix according to a desired resultant resolution, in order to obtain a low resolution discrete-cosine-transformed data. The obtained data is further quantized and the quantized data is entropy encoded.

Another known image processing apparatus divides an original image data into a multiple blocks that includes a plurality of pixels and performs image processing on frequency data that is obtained by converting the blocks of the image data into spatial-frequency components (e.g., see Patent Document 2). In the image processing apparatus, each piece of frequency data in each block is divided into regions according to the frequency level. Moreover, in the image processing apparatus, frequency data of each region is summed starting from the region with a low frequency until the sum reaches or surpasses a threshold value, and a processed region is set to include the regions situated before the region at which the sum reaches or surpasses the threshold value. Data is then selected from the processing region, and an operation is performed on the selected data.

As for the above mentioned examples of the related art, Patent Document 1 is Japanese Patent Application Publication No. H5-316357 and Patent Document 2 is Japanese Patent No. 3722169.

However, according to the techniques described in Patent Document 1 and Patent Document 2, all the pixel data in a whole image area are to be operated. Therefore, a large amount of operations has to be performed and it takes a long time to complete a compression processing.

SUMMARY

A first aspect of the innovations may include an image processing system that includes a characteristic region detecting section that detects a characteristic region from an image; and a compressing section that compresses the image by compressing each prescribed partial region, and the compressing section compressing an image of a partial region included in the characteristic region by using pixel values of pixels of which number is larger than a number of pixels used for compressing an image of a partial region included in a region other than the characteristic region.

A second aspect of the innovations may include an image processing method that includes detecting a characteristic region from an image, and compressing the image by compressing each prescribed partial region, wherein an image of a partial region included in the characteristic region is compressed by using pixel values of pixels of which number is larger than a number of pixels used for compressing an image of a partial region included in a region other than the characteristic region.

A third aspect of the innovations may include a computer readable medium storing therein a program for an image processing apparatus, the program causing the computer to function as: a characteristic region detecting section that detects a characteristic region from an image; and a compressing section that compresses the image by compressing each prescribed partial, and the compressing section compressing an image of a partial region included in the characteristic region by using pixel values of pixels of which number is larger than a number of pixels used for compressing an image of a partial region included in a region other than the characteristic region.

The summary clause does not necessarily describe all necessary features of the embodiments of the present invention. The present invention may also be a sub-combination of the features described above.

The above and other features and advantages of the present invention will become more apparent from the following description of the embodiments taken in conjunction with the accompanying drawings.

BRIEF DESCRIPTION OF THE DRAWINGS

FIG. 6 shows an example of the inclusion region.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
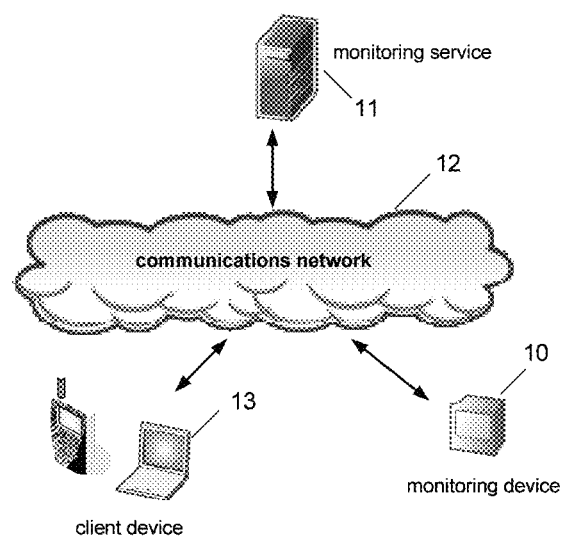
FIG. 1 shows an example of an image processing system 10 according to an embodiment of the invention.

FIG. 1 shows an example of an image processing system 10 according to an embodiment of the invention. The image processing system 10 tries to reduce an amount of image coding while maintaining an image quality in a characteristic region of an image. The image processing system 10 may function as a monitoring system as hereunder described.

The image processing system 10 includes image capturing apparatuses 100a through 100d (hereinafter referred collectively to as an image capturing apparatus 100) that capture images of a monitoring target space 150, an image processing apparatus 120a and an image processing apparatus 120b (hereinafter referred collectively to as an image processing apparatus 120) that process the image captured by the image capturing apparatus 100, a communication network 110, an image processing apparatus 170, an image DB 175 and display apparatuses 180a through 180d (hereinafter referred collectively to as a display apparatus 180).

The image processing apparatus 120a is coupled to the image capturing apparatus 100a and the image capturing apparatus 100b, and the image processing apparatus 120b is coupled to the image capturing apparatus 100c and the image capturing apparatus 100d. The image processing apparatus 170 and the display apparatus 180 are placed in a space 160 which is a different space from the monitoring target space 150.

The image capturing apparatus 100a has an image capturing unit 102a and a captured moving-image compressing unit 104a. The image capturing unit 102a captures an image of the monitoring target space 150 and generates a captured moving image. The captured moving-image compressing unit 104a compresses the moving image captured by the image capturing unit 102a using MPEG coding or the like to generate data of a captured moving image. In this way, the image capturing apparatus 100a encodes the captured moving image of the monitoring target space 150 and generates the captured moving image data. The image capturing apparatus 100a outputs the moving image data to the image processing apparatus 120a to which the image capturing apparatus 100a is coupled.

Since the image capturing apparatus 100b, the image capturing apparatus 100c and the image capturing apparatus 100d respectively have the same configuration as the image capturing apparatus 100a, descriptions for constituent features of the image capturing apparatus 100b, the image capturing apparatus 100c and the image capturing apparatus 100d respectively are hereunder omitted. The image capturing apparatus 100b outputs generated moving image data to the image processing apparatus 120a to which the image capturing apparatus 100b is coupled. The image capturing apparatus 100c and the image capturing apparatus 100d output generated moving image data to the image processing apparatus 120b. In this way, the image processing apparatus 120 obtains the captured moving image data that is generated by the image capturing apparatus 100 from the corresponding image capturing apparatus 100 to which image processing apparatus 120 is coupled.

The image processing apparatus 120 decodes the captured moving image data obtained from the image capturing apparatus 100, generates a captured moving image, and detects a plurality of characteristic regions from the generated captured-moving image. The plurality of the characteristic regions encompasses regions having different types of characteristic such as a region in which a person 130 is captured and a region in which a moving body 140 including a vehicle is captured. The image processing apparatus 120 generates compressed moving image data from the captured moving image. In the compressed moving image data, each of the characteristic regions has a quality higher than that of a region other than the characteristic region. The image processing apparatus 120 generates the compressed moving image data such that images of the characteristic regions are converted into images each of which has a quality corresponding to a degree of importance of the characteristic region. The image processing apparatus 120 transmits the compressed moving image data to the image processing apparatus 170 via the communication network 110, in association with characteristic region information that is information identifying the characteristic region.

The image processing apparatus 170 receives the compressed moving image data associated with the characteristic region information, from the image processing apparatus 120. The image processing apparatus 170 generates a moving image for display by expanding the received compressed moving image data using the associated characteristic region information, and supplies the generated moving image for display to the display apparatus 180. The display apparatus 180 displays the moving image for display, supplied from the image processing apparatus 170.

The image processing apparatus 170 may record, in an image DB 175, the compressed moving image data in accordance with the characteristic region information associated therewith. Then, the image processing apparatus 170 may read the compressed moving image data and the characteristic region information from the image DB 175 in response to a request by the display apparatus 180, generate a moving image for display by expanding the read compressed moving image data using the characteristic region information, and supply the generated moving image for display, to the display apparatus 180.

The characteristic region information may be text data that includes the position, the size and the number of the particular characteristic regions, and identification information identifying moving-image constituting images from which the characteristic regions have been detected, or may be data generated by performing various processes such as compression and encryption on the text data. The image processing apparatus 170 identifies moving-image constituting images that satisfy a various types of search conditions, based on the position, the size and the number of the characteristic regions, or the like, included in the characteristic region information. Subsequently, the image processing apparatus 170 may decode the identified moving-image constituting images and supply them to the display apparatus 180.

In this way, by recording the characteristic regions in association with a moving image, the image processing system 10 can quickly find the moving-image constituting images which match a predetermined condition, and can play the moving image. Moreover, the image processing system 10 can decode only the moving-image constituting images that match a predetermined condition, so that it is possible to display a partial moving image that matches the prescribed conditions quickly in response to a playback instruction.

Figure 2:
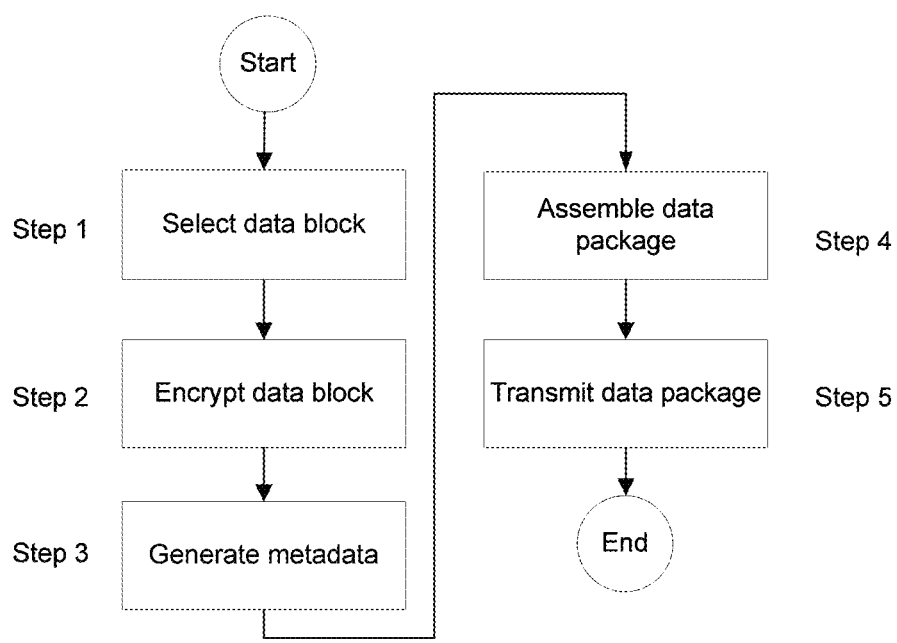
FIG. 2 shows an example of a block configuration of an image processing apparatus 120.

FIG. 2 shows an example of a block configuration of the image processing apparatus 120. The image processing apparatus 120 includes a compressed moving-image obtaining unit 201, a compressed image expanding unit 202 and an image processing unit 200.

The compressed moving-image obtaining unit 201 obtains a compressed moving image. More specifically, the compressed moving-image obtaining unit 201 obtains captured moving image data that is generated and coded by the image capturing apparatus 100. The compressed image expanding unit 202 expands the captured moving image data obtained by the compressed moving-image obtaining unit 201 and generates a plurality of the moving-image constituting images that are included in the captured moving image. More specifically, the compressed image expanding unit 202 decodes the captured moving image data that has been obtained and coded by the compressed moving-image obtaining unit 201, and generates the plurality of the moving-image constituting images that are included in the captured moving image. The moving-image constituting image includes a frame image and a field image.

The image processing unit 200 detects a characteristic region from a captured moving image that includes a plurality of moving-image constituting images generated by the compressed image expanding unit 202, performs a compression processing on the captured moving image according to a characteristic of the detected characteristic region, and outputs the compressed moving image to the image processing apparatus 170. An example of operations of the image processing unit 200 will be given below.

The image processing unit 200 has a characteristic region detecting section 203, an inclusion region identifying section 210, a compression control section 220, a compressing section 230, a correspondence processing section 206, and an output section 207. The characteristic region detecting section 203 detects a characteristic region from a moving image including a plurality of moving-image constituting images. The characteristic region detecting section 203 may detect, as a characteristic region, a region including an object that moves in a moving image.

When the image capturing apparatus 100 is stirred, a position of an object in an image may be slightly deviated between frames. It is preferable that the object of which position is slightly changed be not detected as a moving object. For this reason, the characteristic region detecting section 203 may detect a region that includes an object of which positional change between one captured image and a different captured image, which are moving-image constituting images included in a moving image, is larger than a predetermined value, as a characteristic region. Alternatively, the characteristic region detecting section 203 may detect, as a characteristic region, a region that includes an object of which positional difference between one captured image and a different captured image is larger than a positional difference of the whole image between the captured image and the different captured image. In this way, it may be possible to prevent such an object whose position is changed due to slight movement of the image capturing apparatus 100 and the like from being detected as a moving object.

The characteristic region detecting section 203 supplies the information indicating a detected characteristic region to the compression control section 220. The information indicating a characteristic region includes coordinate information to identify a position of the characteristic region, and type information to identify a type of the characteristic region.

The compression control section 220 controls a compression process of a moving image which is performed by the compressing section 230 according to the characteristic region, based on the information identifying the characteristic region which is obtained through the characteristic region detecting section 203. More specifically, the compression control section 220 has the compressing section 230 perform the hereunder-described compression process.

The compressing section 230 generates a compressed moving image such that more images of non-characteristic regions rather than images of characteristic regions in moving-image constituting images are rendered by using image information of at least a portion of regions in at least a portion of the moving-image constituting images. As an example, the compressing section 230 may encode an image of a region other than a characteristic region by using codes with which the images are expressed by image information of at least a portion of the regions. For example, the compressing section 230 may encode the image of the region other than the characteristic region by using codes through which images of at least a portion of the regions are instructed to be copied.

Specifically, the compressing section 230 may render the image of the region other than the characteristic region by using image information of at least a portion of regions in moving-image constituting images other than the moving-image constituting image in which the characteristic region is detected. For example, the compressing section 230 renders the image of the region other than the characteristic regions by using image information of at least a portion of regions in moving-image constituting images other than the moving-image constituting image in which the characteristic region is detected, in order to generate a compressed moving image in which the region other than the characteristic regions is displayed in time resolutions that are lower than time resolutions of the characteristic regions. Alternatively, the compressing section 230 may render an image of the non-characteristic region by using image information of other region in the moving-image constituting image in which the characteristic region is detected, in order to generate a compressed moving image.

For example, the compressing section 230 may encode an image of the non-characteristic region with a code indicating that the image is expressed by using image information of at least a portion of regions in the moving-image constituting image in which the characteristic region is detected or in moving-image constituting images other than the moving-image constituting image in which the characteristic region is detected. Such encoding may be hereunder referred to as "reference encoding." The "reference encoding" used in this description encompasses both encoding an image such that the image is expressed by using image information of at least a portion of regions in other moving-image constituting images, and encoding an image such that the image is expressed by using image information of other regions in the same moving-image constituting image in which the image exists. In the reference encoding, image information of the targeted region of the reference encoding may not be necessarily used.

Operation of each section included in the compressing section 230 will be now described. The compressing section 230 generates a compressed moving image by compressing each image of a plurality of predetermined partial regions in a moving-image constituting image. More specifically, the compressing section 230 renders each image of the partial regions included in a region other than the characteristic regions by using image information of at least a portion of regions in at least a portion of moving-image constituting images, in order to generate a compressed moving image. In this way, the compressing section 230 performs encoding by performing the reference encoding of each partial region included in a region other than the characteristic regions.

For example, the compressing section 230 may render each image of the plurality of the partial regions included in the regions other than the characteristic regions by a zero vector of motion vector, in order to generate a compressed moving image. Moreover, the compressing section 230 may render each image of the plurality of the partial regions included in the region other than the characteristic regions by a zero vector of a motion vector and a zero-difference value of a difference value between the image and a predicted image, in order to generate a compressed moving image. Alternatively, the compressing section 230 may encode the images of the plurality of the partial regions included in the region other than the characteristic regions by using codes indicating regions that represent the images, in order to generate a compressed moving image. Note that the partial region may be a macroblock. The compressing section 230 may treat each of macroblocks included in the region other than the characteristic regions as a skipped macroblock.

The characteristic region detecting section 203 may detect different characteristic types of characteristic regions in a moving image. Here, the characteristic types may be defined depending on types of objects (e.g., a person, a moving body). Moreover, the types of objects may be determined based on a degree of matching of the shapes or the colors of the objects For example, the characteristic region detecting section 203 may extract, from each of a plurality of moving-image constituting images, an object that matches a predetermined shape pattern at a degree equal to or greater than a predetermined matching degree, and detect the regions in the moving-image constituting images that include the extracted object, as characteristic regions having the same characteristic type. Note that more than one shape patterns may be defined depending on the characteristic types. An example of such shape pattern can be given as a shape pattern representing a face of a person. Note that more than one face pattern can be provided corresponding to different persons. In this way, the characteristic region detecting section 203 can detect regions respectively including different persons, as characteristic regions different from each other.

When the characteristic region detecting section 203 detects a plurality of characteristic regions that have different types of characteristics in a moving image, the compressing section 230 may render images of the plurality of the characteristic regions in a prescribed number of moving-image constituting images that are selected depending on the types of the characteristic regions, by using image information of at least a portion of regions in moving-image constituting images other than the moving-image constituting images in which the characteristic regions are detected. In this way, the compressing section 230 may generate a compressed moving image in which each of the characteristic regions is displayed in a corresponding time resolution that is predetermined depending on the characteristic types. As a result, the compressing section 230 can provide a moving image in which an image quality for each of the characteristic regions is set depending on its characteristic type.

The inclusion region identifying section 210 identifies an inclusion region that includes a plurality of characteristic regions which are detected by the characteristic region detecting section 203 from a series of moving-image constituting images. The inclusion region identifying section 210 supplies information identifying the inclusion region to the compression control section 220. The compression control section 220 makes the compressing section 230 perform the similar process as the above-mentioned process performed on the characteristic regions, based on the information identifying the inclusion region. In other words, concerning one or more moving-image constituting images in a series of moving-image constituting images, the compressing section 230 renders each of images of partial regions included in regions other than the inclusive region by using image information of at least a portion of regions in at least a portion of the moving-image constituting images, in order to generate a compressed moving image.

Note that the inclusion region identifying section 210 identifies, as the inclusion region, a collective region of partial regions that include a plurality of characteristic regions in each of a plurality of moving-image constituting images. For example, the inclusion region identifying section 210 may identify a collective region of macroblocks that encompass a plurality of characteristic regions in each of a plurality of moving-image constituting images, as the inclusion region.

The compressing section 230 performs compression of a moving image by compressing partial moving images each of which includes a prescribed number of moving-image constituting images, and a compressed moving image is generated. In this case, a series of moving-image constituting images is included in the same partial moving image. For example, when compression of a moving image is performed for each GOP by the compressing section 230, a series of moving-image constituting images is included in the same GOP.

The compressing section 230 includes a pixel selecting section 232, a moving-image constituting image selecting section 234 and an encoder 240. The moving-image constituting image selecting section 234 selects moving-image constituting images on which the above-mentioned reference encoding are performed, depending on characteristic types. For example, the moving-image constituting image selecting section 234 may select, among a plurality of moving-image constituting images, a prescribed number of the moving-image constituting images as moving-image constituting images that are to be reference encoded. The prescribed number is determined depending on the characteristic types of characteristic regions. Moreover, the moving-image constituting image selecting section 234 may select the moving-image constituting images that are to be reference encoded, for each characteristic type. Furthermore, the moving-image constituting image selecting section 234 may select more moving-image constituting images in which an image of non-characteristic region is to be reference encoded, compared to the number of the moving-image constituting images in which images of the characteristic regions are reference encoded.

The encoder 240 encodes a plurality of moving-image constituting images obtained from the compressed image expanding unit 202 that expands the moving-image constituting images. At this point, regarding the moving-image constituting images selected by the moving-image constituting image selecting section 234, the encoder 240 reference encodes images of partial regions included in a plurality of characteristic regions and the other regions. The encoder 240 also encodes moving-image constituting images that are not selected by the moving-image constituting image selecting section 234 by an encoding method other than the reference encoding method. Functions and operations of constituting elements included in the pixel selecting section 232 and the encoder 240 will be described later.

In the above description, the operation of the compressing section 230 when the compressing section 230 performs the reference encoding has been given. As for partial regions other than the partial regions which are reference encoded, operation of each constituting element in the image processing apparatus 120 will be now described. The compressing section 230 compresses an image of each prescribed partial region as described above. When the compressing section 230 compresses an image of a partial region included in a characteristic region, the compression is performed by using pixel values of pixels of which number is larger compared to that of when an image of a partial region included in a non-characteristic region is compressed. More specifically, when an image of a partial region included in a characteristic region is compressed, the compressing section 230 uses pixel values of the pixels in the partial region, and the number of the pixels in the partial region is larger compared to the case in which an image of a partial region included in a region other than the characteristic region is compressed. Furthermore, when an image of a partial region included in a characteristic region is compressed, the compressing section 230 may use pixel values of pixels that include a pixel of a region other than the partial region, and the number of the pixels is larger compared to the case in which an image of a partial region included in a region other than the characteristic region is compressed. Operation of each constituting element included in the compressing section 230 will be now described.

The compressing section 230 includes a spatial-frequency-component calculating section 242, a quantizing section 244 and an encoding section 246. The spatial-frequency-component calculating section 242 calculates a spatial frequency component of each partial region. The spatial-frequency-component calculating section 242 may transform an image of each partial region into a discrete cosine transform (DCT) coefficient by conducting a DCT transform, in order to calculate the spatial frequency component of each partial region. Alternatively, the spatial-frequency-component calculating section 242 may transform an image of each partial region into a wavelet expansion coefficient by performing a wavelet transform, in order to calculate the spatial frequency component.

The quantizing section 244 quantizes the spatial-frequency component that has been calculated by the spatial-frequency-component calculating section 242. The encoding section 246 encodes the spatial frequency component that has been quantized by the quantizing section 244, by, for example, an entropy encoding method.

When the spatial-frequency-component calculating section 242 calculates a spatial frequency component of a partial region included in a characteristic region, the calculating section 242 uses pixel values of pixels, the number of the pixels is larger than the number of pixels used for calculating a spatial frequency component of a region other than characteristic regions. More specifically, when the spatial-frequency-component calculating section 242 calculates a spatial frequency component of a region other than a characteristic region, a less number of pixels, which is a unit used in the frequency component calculation, are used compared to the case in which a spatial frequency component of the characteristic region is calculated. In other words, when the spatial-frequency-component calculating section 242 calculates a spatial frequency component of a partial region included in the region other than a characteristic region, the size of the macroblock, which is a unit used in the frequency component calculation, is made smaller compared with a macroblock size which is used for calculating a spatial frequency component of a partial region included in the characteristic region.

At this point, the pixel selecting section 232 selects a small number of pixels which corresponds to the small macroblock size, among pixels included in a partial region included in the non-characteristic region. The spatial-frequency-component calculating section 242 then calculates the spatial frequency component using the pixels selected by the pixel selecting section 232. When the quantizing section 244 quantizes the spatial frequency component calculated for the partial region included in the characteristic region, the quantizing section 244 performs the quantization by using a quantization step smaller than a quantization step which is used for quantizing a spatial frequency component calculated for a partial region included in the non-characteristic region.

Here, the pixel selecting section 232 may select a prescribed number of pixels among pixels included in a partial region included in each of the characteristic regions, and the prescribed number may be set depending on the characteristic types of the characteristic regions. The spatial-frequency-component calculating section 242 calculates a spatial frequency component using a macroblock that includes a predetermined number of pixels as a calculation unit, and the number of pixels is set according to the characteristic types of the characteristic regions. The quantizing section 244 may quantize the spatial frequency component calculated for the partial region included in each of the characteristic regions, using a prescribed quantization step which is set depending on the characteristic types. As described above, the compressing section 230 can compress an image of a characteristic region with a compression rate according to the characteristic types of the characteristic regions.

The compressing section 230 supplies the compressed moving image obtained through encoding by the encoding section 246, to the correspondence processing section 206. The correspondence processing section 206 associates the compressed moving image obtained from the compressing section 230 with characteristic region information obtained from the compression control section 220. For example, the correspondence processing section 206 attaches the compressed moving image with information identifying moving-image constituting images included in the compressed moving image, information identifying position of characteristic regions, and characteristic region information with which identifying the characteristic types of the characteristic regions are associated. The output section 207 outputs, to the image processing apparatus 170, the compressed moving image with which the characteristic region information is attached. More specifically, the output section 207 sends the compressed moving image with which the characteristic region information is attached to the image processing apparatus 170 via the communication network 110.

Figure 3:
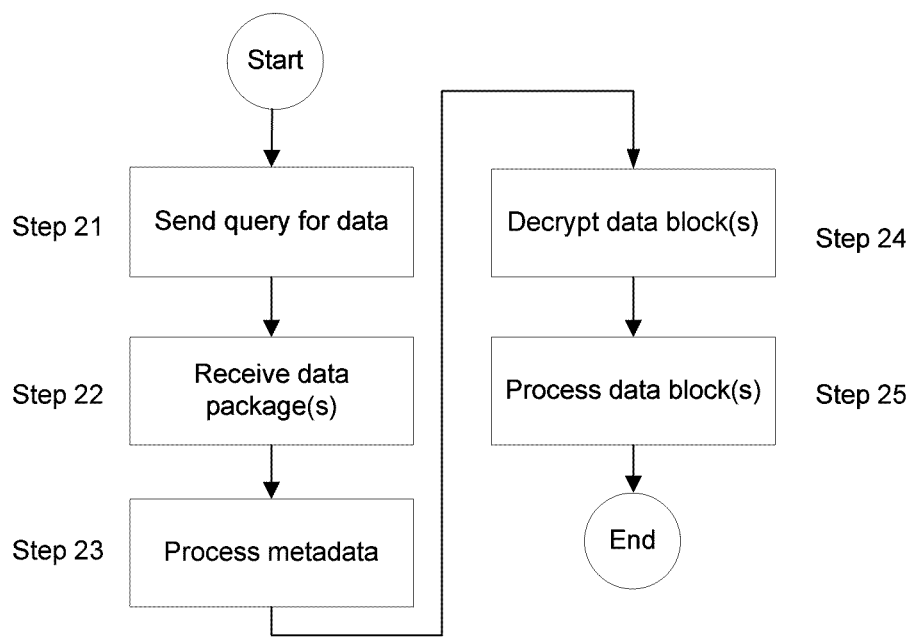
FIG. 3 shows an example of a block configuration of the image processing apparatus 170.

FIG. 3 shows an example of a block configuration of the image processing apparatus 170. The image processing apparatus 170 includes a compressed image obtaining section 301, a correspondence analyzing section 302, an expansion control section 310, an expanding section 320 and an output section 304. The compressed image obtaining section 301 obtains a compressed moving image including a plurality of moving-image constituting images and compressed by the compression section 230. Specifically, the compressed image obtaining section 301 obtains a compressed moving image The correspondence analyzing section 302 separates the compressed moving image from the characteristic region information which has been attached to the compressed moving image, and supplies the compressed moving image to the expanding section 320. The correspondence analyzing section 302 analyzes the characteristic region information, and supplies the position and the characteristic type of the characteristic region to the expansion control section 310. The expansion control section 310 controls expansion processing of the expanding section 320, according to the position and the characteristic type of the characteristic region obtained from the correspondence analyzing section 302. For example, the expansion control section 310 controls the expanding section 320 to expand each region of the moving image represented by the compressed moving image, according to a compression method having been used by the compression section 230 to compress each region of the moving image according to the position and the characteristic type of the characteristic region.

Operation of each constituting element of expanding section 320 that decodes each partial region in the compressed moving-image constituting images obtained by the compressed image obtaining section 301 will be now described. The expanding section 320 includes a decoder 330, a partial-region image enlarging section 322, and a compositing section 324.

The decoder 330 decodes the encoded compressed moving image. For example, the decoder 330 decodes each partial region (e.g., each macroblock) of the encoded moving-image constituting images included in the compressed moving image. Specifically, the decoder 330 includes a decoding section 332, an inverse quantizing section 334, and an inverse converting section 336.

The decoding section 332 decodes the encoded data which has been encoded by the encoding section 246, and extracts a quantized spatial-frequency component. The inverse quantizing section 334 inverse quantizes the quantized spatial-frequency component in order to extracts a spatial frequency component. The inverse converting section 336 performs an inverse conversion processing on the spatial frequency component to calculate a pixel value, and the inverse conversion processing is an inverse of the conversion of the spatial frequency component performed by the spatial-frequency-component calculating section 242.

As described above, from data of a region where pixel values of the pixels selected from a plurality of pixels included in a partial region are encoded by the encoder 240, and the decoder 330 outputs pixel values of the pixels as many as the selected pixels. The partial-region image enlarging section 322 enlarges an image of the region that is represented by the output pixel values to a predetermined size of an image of a partial region. As described above, the partial-region image enlarging section 322 enlarges the image of the partial region which has been decoded by the expanding section, by an enlargement factor corresponding to the number of the pixels used for compression by the compression section 230. In this way, an image of each partial region included in a moving-image constituting image is generated.

The compositing section 324 composites images of the partial regions so as to form a single moving-image constituting image. As for an image of a reference-encoded partial region, the compositing section 324 can obtain the image from an image of other region in the same or other moving-image constituting image. The expanding section 320 outputs the moving-image constituting image generated through the expansion of the compressed moving image to the output section 304. The output section 304 outputs, to the display apparatus 180 and the image DB 175, the characteristic region information obtained from the correspondence analyzing section 302 and the moving-image constituting image generated through the expansion. Note that the image DB 175 may record, in a nonvolatile recording medium such as a hard disk, the position, the characteristic type, and the number of the characteristic regions that are included in the characteristic region information, in association with information identifying the moving-image constituting images.

According to the above-described the image processing system 10, it is possible to reduce the amount of data by compressing a moving image efficiently in accordance with the characteristic types of characteristic regions while maintaining image qualities of the characteristic regions. In the embodiment, a moving-image constituting image may be an example of an image which is processed by the image processing apparatus 120 and the image processing apparatus 170. In other words, the image processing apparatus 120 can compress an image in units of images, and can also compress a moving image in units of a plurality of moving-image constituting images. The image processing apparatus 170 can decode the compressed image which has been compressed image by image. In other words, the image processing apparatus 120 and the image processing apparatus 170 can process a stationary image.

Figure 4:
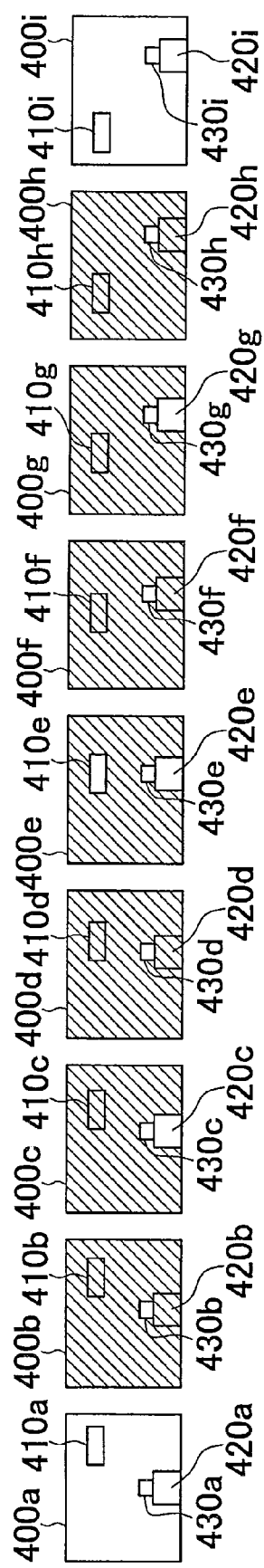
FIG. 4 shows an example of compression processing by a compression section 230.

FIG. 4 shows an example of compression processing by the compression section 230. A plurality of moving-image constituting images 400a through 400i represent moving-image constituting images that are expanded by the compressed image expanding unit 202. Here, the characteristic region detecting section 203 detects moving body regions 410a through 410i, body-part regions 420a through 420i and head-part regions 430a through 430i, from moving-image constituting images 400a through 400i. For example, the moving body regions 410a-410i represent regions in which the moving body 140 is captured, the body-part regions 420a-420i represent regions in which a body part of the person 130 is captured, and the head-part regions 430a-430i represent regions in which a head part of the person 130 is captured. In the following description, the moving-image constituting images 400a-400i, the moving body regions 410a-410i, the body-part regions 420a-420i and the head-part regions 430a-430i may be collectively referred to as a moving-image constituting image 400, a moving body region 410, a body-part region 420 and a head-part region 430, respectively.

The moving-image constituting image selecting section 234 selects the moving-image constituting images 400b-400d and the moving-image constituting images 400f-400h as the moving-image constituting image 400 in which the image of the moving body region 410 is reference encoded. The moving-image constituting image selecting section 234 also selects every other moving-image constituting image 400 in order to reference encode an image in the body-part region 420, in other words, the selecting section selects the moving-image constituting image 400b, the moving-image constituting image 400d, the moving-image constituting image 400f and the moving-image constituting image 400h as the moving-image constituting image 400 for reference encoding the image of the body-part region 420. The moving-image constituting image selecting section 234 also selects the moving-image constituting images 400b-400h as the moving-image constituting image 400 in which regions other than the characteristic regions, in other words, regions that do not correspond to any of the moving body region 410, the body-part region 420 and the head-part region 430 in the illustrated example (this region may be collectively referred to as a background region), is reference encoded.

In the drawing, the regions to be reference encoded in the moving-image constituting image 400 are marked with diagonal lines. It can be seen from the illustrated example, the compressing section 230 does not reference encode the head-part region 430. A ratio of the number of the moving-image constituting images 400 selected as the moving-image constituting images 400 in which an image of a characteristic region is reference encoded may be recorded in advance in the moving-image constituting image selecting section 234 such that the ratio information is associated with information identifying a characteristic type of the characteristic region. A ratio of the number of the moving-image constituting images 400 selected as the moving-image constituting images 400 in which an image of a background region is reference encoded may be recorded in advance in the moving-image constituting image selecting section 234 such that the ratio information is associated with information identifying the background region.

The moving-image constituting image selecting section 234 may obtain the ratio of the to-be-selected moving-image constituting images 400 which is stored in association with the information identifying the characteristic type of the characteristic region or the information identifying the background region, may calculate the number of the moving-image constituting images 400 which are selected as the moving-image constituting images 400 to be reference encoded, and then may select the calculated number of the moving-image constituting images 400.

The above-mentioned ratio may be information indicating a ratio of the number of the to-be-reference-encoded moving-image constituting images 400 to the total number of the moving-image constituting images 400.

As described above, the moving-image constituting image selecting section 234 may select different numbers of moving-image constituting images as the moving-image constituting images that are to be reference encoded, according to the importance of each image region. In this way, the image processing apparatus 120 can provided one stream of compressed moving image in which each of image regions is displayed in a time resolution corresponding to its importance. The one stream of compressed moving image in which each of image regions is displayed in a time resolution corresponding to its importance is generated by the compressing section 230 that adopts zero vector as a motion vector in an image region where to be reference encoded, treats a macroblock included in the image region as a skipped macroblock, and performs encoding using, for example, information indicating an image region that should be referenced. Consequently, it is possible to reduce the amount of the codes in a compressed moving image significantly.

Figure 5:
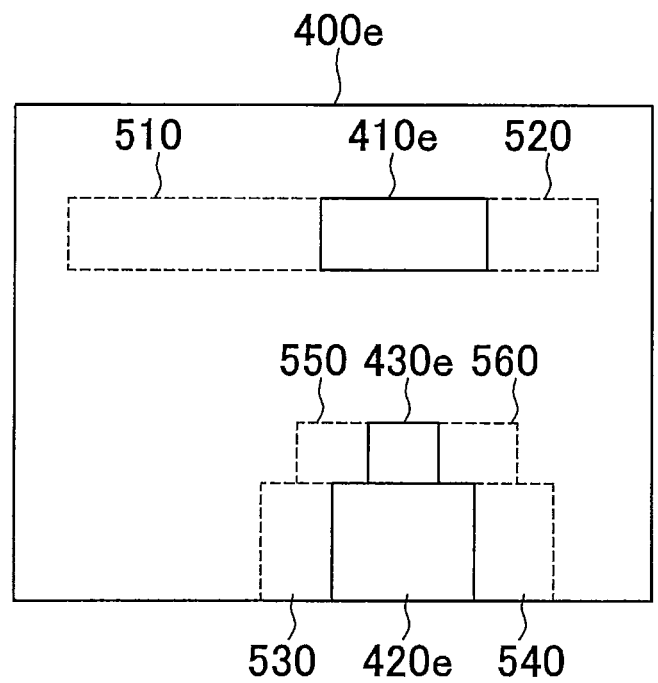
FIG. 5 illustrates an example of a background region around a characteristic region.

FIG. 5 illustrates an example of a background region around a characteristic region. Referring to FIG. 5, an anterior region 510 indicates a region where a moving body region 410*e* moves in a partial moving image consisting of moving-image constituting images 400*e* through 400*i*. A posterior region 520 indicates a region where the moving body region 410*e* moves in a partial moving image consisting of moving-image constituting images 400*a* through 400*d*. Referring to FIG. 4, in the partial moving image consisting of the moving-image constituting images 400*a*-400*i*, the moving body region 410*e* moves to a left direction in the image. This means that an image of the posterior region 520 is not included in the moving-image constituting image 400*a*, since the posterior region 520 is situated on an opposite side of the moving body region 410*e* with respect to the moving direction of the moving body region 410*e*. Whereas an image of the anterior region 510 is not included in the moving-image constituting image 400*i*, since the anterior region 510 is situated on a side of the moving body region 410*e* toward which the moving body region 410*e* moves.

As described above, images in the anterior region 510 and the posterior region 520 are included only in either the moving-image constituting image 400*a* which is not reference encoded or the moving-image constituting image 400*i*, respectively. Therefore, when an image region which is going to be a background of a moving body, such as the anterior region 510 and the posterior region 520, is reference encoded, it requires to appropriately select the moving-image constituting image 400 which is to be referenced.

In this case, the compressing section 230 encodes an image of the posterior region 520 with a code indicating that the image is rendered by using image information of the moving-image constituting image 400*i* or a code indicating that the image is rendered by using image information of the moving-image constituting image 400 in which the posterior region 520 is rendered by using an image in the moving-image constituting image 400*i*. The compressing section 230 also encodes an image of the anterior region 510 with a code indicating that the image is rendered by using image information of the moving-image constituting image 400*a* or a code indicating that the image is rendered by using image information of the moving-image constituting image 400 in which the anterior region 510 is rendered by using an image in the moving-image constituting image 400*a*.

In the same manner, the compressing section 230 may also perform processing on a posterior region 530 and an anterior region 540, and a posterior region 550 and an anterior region 560. In other words, the compressing section 230 encodes images of the posterior region 530 and the posterior region 550 by using a code indicating that the images are rendered by using image information of the moving-image constituting image 400 which is displayed later or code indicating that the images are rendered by using image information of the moving-image constituting image 400 in which the posterior region 530 and the posterior region 550 are rendered by using images in the later-displayed moving-image constituting image 400. The compressing section 230 also encodes images of the anterior region 540 and the anterior region 560 by using a code indicating that the images are rendered by using image information of the moving-image constituting image 400 which is displayed earlier or code indicating that the images are rendered by using image information of the moving-image constituting image 400 in which the anterior region 540 and the anterior region 560 are rendered by using images in the earlier-displayed moving-image constituting image 400.

As described above, the compressing section 230 renders images of partial regions included in a region which is not a characteristic region and situated on a side toward which the characteristic region moves with respect to the characteristic region, by using image information of at least a portion of regions of at least a portion of the moving-image constituting images which are displayed prior to the moving-image constituting image in which the characteristic region is detected. The compressing section 230 also renders images of partial regions included in a region which is not a characteristic region and situated on the opposite side from which the characteristic region moves away with respect to the characteristic region, by using image information of at least a portion of regions of at least a portion of the moving-image constituting images which are displayed after the moving-image constituting image in which the characteristic region is detected. The above-mentioned moving-image constituting image that is displayed priorly may be a moving-image constituting image that is captured earlier, and the above-mentioned moving-image constituting image that is displayed after may be a moving-image constituting image that is captured later.

As described above, the compressing section 230 renders images of partial regions included in a region other than characteristic regions by using image information of at least a portion of regions of at least a portion of the moving-image constituting images that are selected based on the moving directions of the characteristic regions in a series of moving-image constituting images. In this way, the compressing section 230 appropriately selects moving-image constituting images in which the background region of a moving body, which is a region other than a moving region of the moving body, is included. Therefore it is possible to appropriately encode the moving image in which the moving body is captured.

FIG. 6 shows an example of the inclusion region. The inclusion region identifying section 210 identifies an inclusion region 610 of the moving body region 410, an inclusion region 620 of the body-part region 420 and an inclusion region 630 of the head-part region 430, from partial moving-images of the moving-image constituting images 400*a* through 400*i*. In this way, the inclusion region identifying section 210 identifies an inclusion region in each characteristic type of the characteristic regions in a partial moving image consisting of a plurality of moving-image constituting images. The inclusion region identifying section 210 may identify a region that includes one characteristic type of characteristic region and consists of more than one macroblock, as an inclusion region.

The compressing section 230 reference-encodes regions other than the inclusion region 610 in each of the moving-image constituting images 400*a* through 400*i* through the compression control section 220. The compressing section 230 does not reference-encodes the inclusion region 610 in each of the moving-image constituting images 400*a* through 400*i*. In this way, the compressing section 230 only reference-encodes the regions in which a moving body does not move in a partial moving image, so that it is possible to prevent an object representing a moving object in other moving-image constituting image 400 from appearing in a reference-encoded region. The compressing section 230 may compress images included in an inclusion region which is specified depending on the types of characteristic regions to a compression degree which is predetermined according to the types of the characteristic regions.

Figure 7:
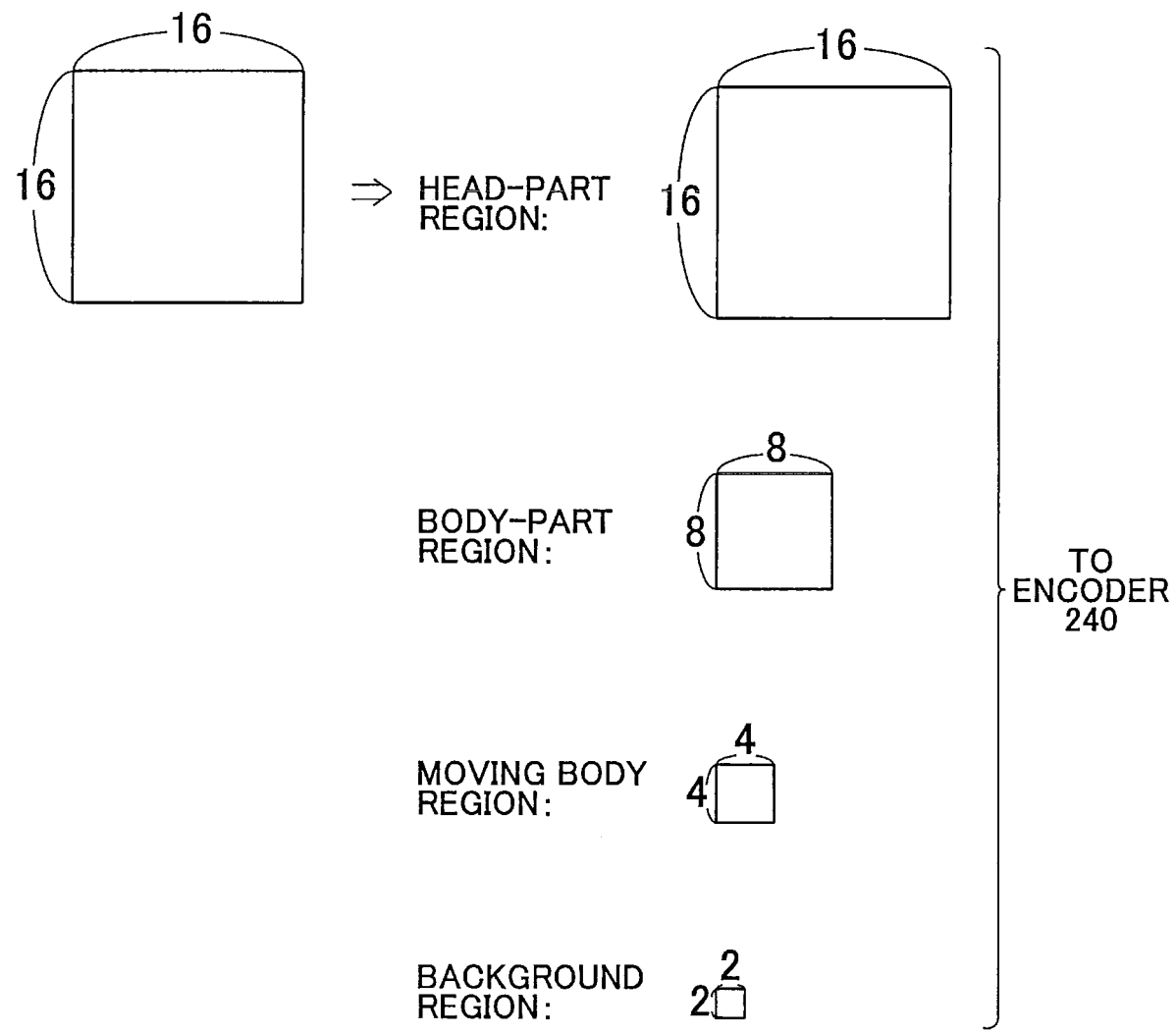
FIG. 7 illustrates a partial region which is a processing unit for encoding by an encoder 240.

FIG. 7 illustrates a partial region which is a processing unit for encoding by the encoder 240. The encoder 240 encodes moving-image constituting images by a partial region consisting of 16 pixels×16 pixels.

When the encoder 240 encodes an image in the head-part region 430, the encoder 240 operates in an operation mode in which a macroblock of 16 pixels×16 pixels is encoded through control by the compression control section 220. Specifically, the pixel selecting section 232 selects all the pixels included in the 16 pixels×16 pixels of a partial region in the head-part region 430, and supplies the pixel values of the selected pixels to the encoder 240. The encoder 240 conduct encoding by using the pixel values of the 16 pixels×16 pixels supplied from the pixel selecting section 232. More specifically, the spatial-frequency-component calculating section 242 performs the discrete cosine transform using the pixel values of the 16 pixels×16 pixels supplied from the pixel selecting section 232. The quantizing section 244 quantizes a transform coefficient calculated by the spatial-frequency-component calculating section 242. The encoding section 246 entropy-encodes the quantized values, and such entropy-encoding include a Huffman coding, an arithmetic coding and the like.

When the encoder 240 encodes the image of the body-part region 420, the encoder 240 operates in an operation mode in which a macroblock of 8 pixels×8 pixels is encoded through the compression control section 220. Specifically, the pixel selecting section 232 selects an 8 pixels×8 pixels from the partial region of the 16 pixels×16 pixels included in the body-part region 420, and supplies the selected pixel values to the encoder 240. The encoder 240 performs encoding using the pixels values of the 8 pixels×8 pixels supplied from the pixel selecting section 232.

More specifically, the spatial-frequency-component calculating section 242 performs discrete cosine transform using the pixel values of the 8 pixels×8 pixels supplied from the pixel selecting section 232. The quantizing section 244 quantizes a transform coefficient calculated by the spatial-frequency-component calculating section 242. The encoding section 246 entropy-encodes the quantized values, and such entropy-encoding include a Huffman coding, an arithmetic coding and the like. The encoder 240 does not encode pixels other than the 8 pixels×8 pixels selected by the pixel selecting section 232 from the partial region of the 16 pixels×16 pixels included in the body-part region 420.

In the same manner, when the encoder 240 encodes an image of the moving body region 410, the encoder 240 operates in an operation mode in which a macroblock of a 4 pixels×4 pixels is encoded through the compression control section 220. Specifically, the pixel selecting section 232 selects a 4 pixels×4 pixels from the partial region of the 16 pixels×16 pixels included in the moving body region 410, and supplies the selected pixel values to the encoder 240. The encoder 240 performs encoding using the pixels values of the 4 pixels×4 pixels supplied from the pixel selecting section 232.

More specifically, the spatial-frequency-component calculating section 242 performs discrete cosine transform using the pixel values of the 4 pixels×4 pixels supplied from the pixel selecting section 232. The quantizing section 244 quantizes a transform coefficient calculated by the spatial-frequency-component calculating section 242. The encoding section 246 entropy-encodes the quantized values, and such entropy-encoding include a Huffman coding, an arithmetic coding and the like. The encoder 240 does not encode pixels other than the 4 pixels×4 pixels selected by the pixel selecting section 232 from the partial region of the 16 pixels×16 pixels included in the moving body region 410.

When the encoder 240 encodes an image of a background region, the encoder 240 operates in an operation mode in which a macroblock of a 2 pixels×2 pixels is encoded through the compression control section 220. Specifically, the pixel selecting section 232 selects a 2 pixels×2 pixels from the partial region of the 16 pixels×16 pixels included in the background region, and supplies the selected pixel values to the encoder 240. The encoder 240 performs encoding using the pixels values of the 2 pixels×2 pixels supplied from the pixel selecting section 232.

More specifically, the spatial-frequency-component calculating section 242 performs discrete cosine transform using the pixel values of the 2 pixels×2 pixels supplied from the pixel selecting section 232. The quantizing section 244 quantizes a transform coefficient calculated by the spatial-frequency-component calculating section 242. The encoding section 246 entropy-encodes the quantized values, and such entropy-encoding include a Huffman coding, an arithmetic coding and the like. The encoder 240 does not encode pixels other than the 2 pixels×2 pixels selected by the pixel selecting section 232 from the partial region of the 16 pixels×16 pixels included in the background region.

In the above-described way, the compression control section 220 sets the encoder 240 to a corresponding operation mode in which a pixel block of a predetermined number of pixels (or a predetermined size of pixel block) determined according to the types of characteristic regions or a background region are encoded The pixel selecting section 232 then selects the predetermined number of pixels from a plurality of pixels included in a partial region, and supplies the selected pixel values to the encoder 240. Therefore, when the encoder 240 encodes an image of one partial region, the encoder may use pixel values supplied from the pixel selecting section 232, for example, pixel values of pixels which are pruned by the pixel selecting section 232, to perform encoding, and the encoder 240 does not perform encoding operation of pixel values of other pixels included in the partial region. Thus, it is possible to reduce the amount of operations performed by the encoder 240 significantly. Consequently, it is possible to improve an encoding speed of an image.

In the image processing apparatus 170, the expansion control section 310 sets the decoder 330 to an operation mode in which a pixel block of a predetermined number of pixel blocks which is determined depending on the types of characteristic regions and a background region. The partial-region image enlarging section 322 performs enlarging processing on the pixel values supplied from the decoder 330 to obtain the image of the partial region. As described above, the image processing apparatus 120 and the image processing apparatus 170 conducts operations on a predetermined number of pixels which is determined according to the types of characteristic regions and a background region, thus the amount of the operations can be significantly reduced. As a result, it is possible to increase the image processing speed.

Figure 8:
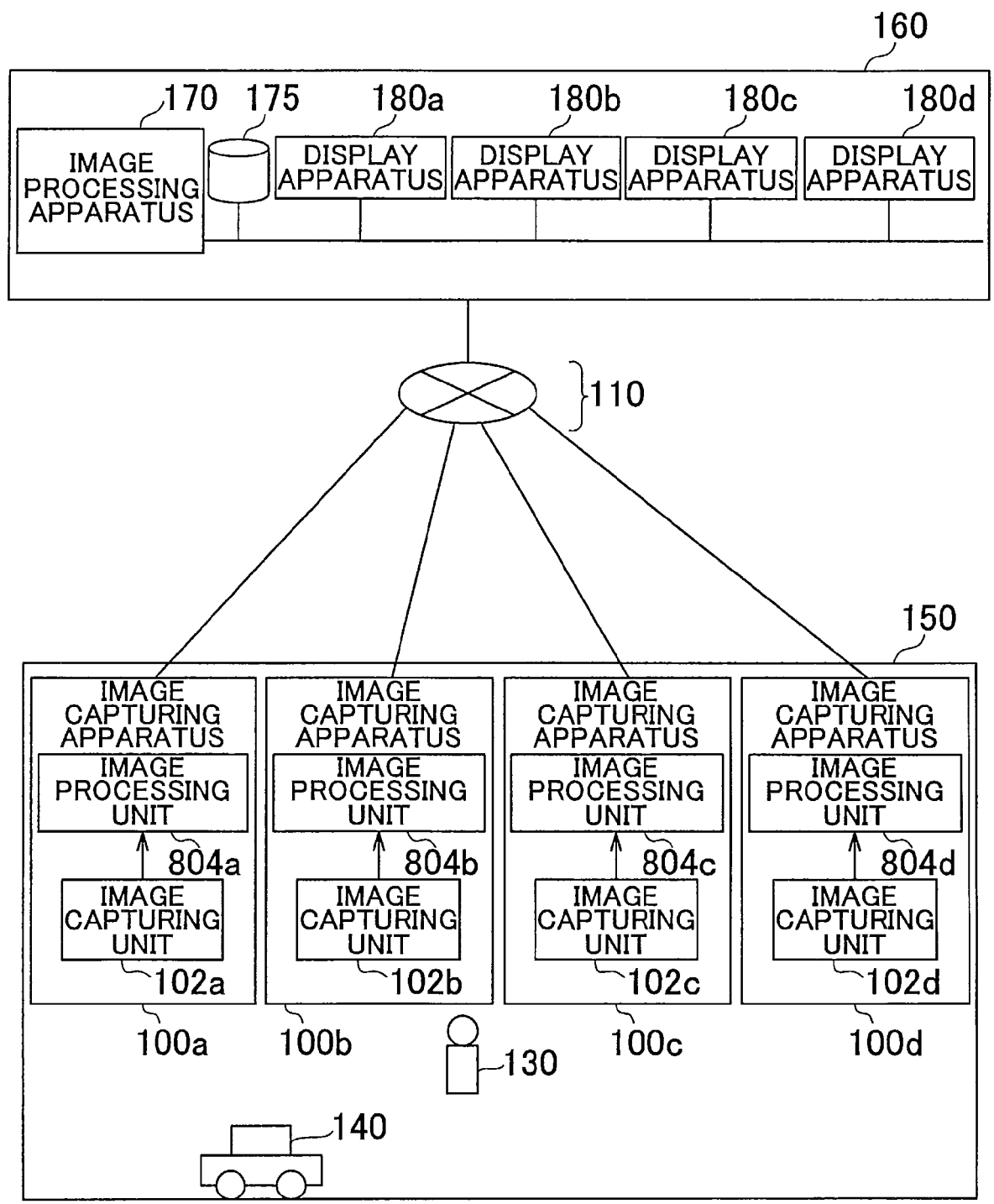
FIG. 8 illustrates an example of an image processing system 20 according to another embodiment of the invention.

FIG. 8 illustrates an example of an image processing system 20 according to another embodiment of the invention. The image processing system 20 has the same configuration as that of the image processing system 10 described with reference to FIG. 1, except for the image capturing apparatuses 100a through 100d which have image processing units 804a through 804d respectively (hereinafter referred collectively to as an image processing unit 804).

The image processing unit 804 has the same configuration as the image processing unit 200. Function and an operation of each element included in the image processing unit 804 are substantially the same as those of the corresponding element included in the image processing unit 200, except that the elements in the image processing unit 804 process a captured moving image captured by the image capturing unit 102 in stead of the captured moving image which is obtained through the expansion process by the compressed image expanding unit 202 in the image processing unit 200. In the same manner described above, this image processing system 20 can have the same advantages effects as those of the image processing system 10 which have been described with reference to FIGS. 1 through 7.

Figure 9:
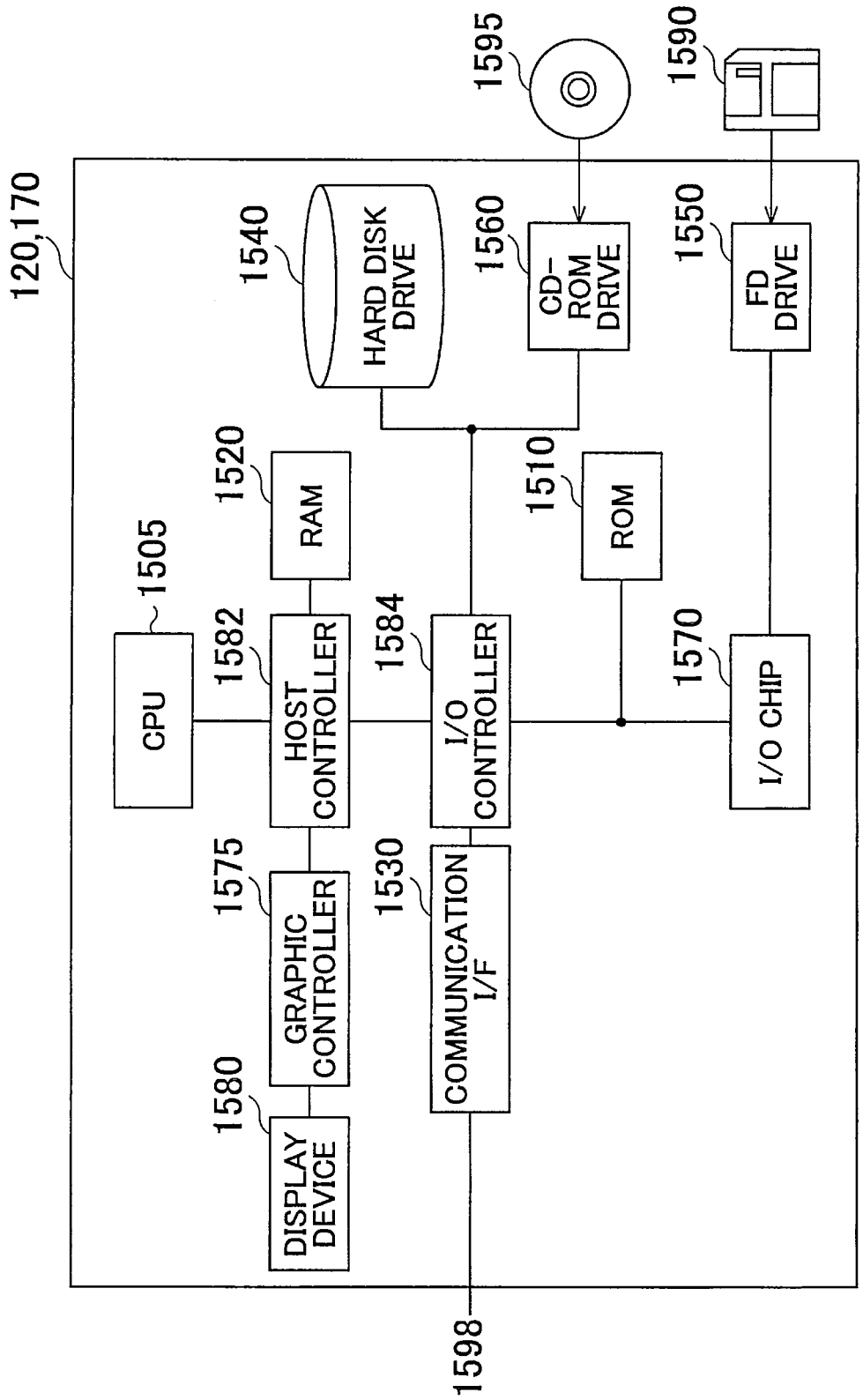
FIG. 9 shows an example of a hardware configuration of the image processing apparatus 120 and the image processing apparatus 170.

FIG. 9 shows an example of a hardware configuration of the image processing apparatus 120 and the image processing apparatus 170. The image processing apparatus 120 and the image processing apparatus 170 include a CPU peripheral section, an input/output section, and a legacy input/output section. The CPU peripheral section includes a CPU 1505, a RAM 1520, a graphic controller 1575, and a display device 1580 coupled to each other through a host controller 1582. The input/output section includes a communication interface 1530, a hard disk drive 1540, and a CD-ROM drive 1560, all of which are coupled to the host controller 1582 through an input/output controller 1584. The legacy input/output section includes a ROM 1510, a flexible disk drive 1550, and an input/output chip 1570, all of which are connected to the input/output controller 1584.

The host controller 1582 connects the RAM 1520, the CPU 1505 that accesses the RAM 1520 at a high transfer rate and the graphic controller 1575 each other. The CPU 1505 operates to control each section based on programs stored in the ROM 1510 and the RAM 1520. The graphic controller 1575 obtains image data generated by the CPU 1505 or the like on a frame buffer provided inside the RAM 1520 and displays the image data in the display device 1580. Alternatively, the graphic controller 1575 may internally include the frame buffer storing the image data generated by the CPU 1505 or the like.

The input/output controller 1584 connects the hard disk drive 1540 that is a relatively high speed input/output apparatus, the communication interface 1530 and the CD-ROM drive 1560 to the host controller 1582. The hard disk drive 1540 stores the programs and data used by the CPU 1505. The communication interface 1530 transmits or receives programs and data by connecting to the network communication apparatus 1598. The CD-ROM drive 1560 reads the programs and data from a CD-ROM 1595 and provides the read programs and data to the hard disk drive 1540 and to the communication interface 1530 via the RAM 1520.

Furthermore, the input/output controller 1584 is connected to the ROM 1510, the flexible disk drive 1550 and the input/output chip 1570 that are relatively low speed input/output apparatuses. The ROM 1510 stores a boot program executed when the image processing apparatus 120 and the image processing apparatus 170 start up, a program relying on the hardware of the image processing apparatus 120 and the image processing apparatus 170, and so on. The flexible disk drive 1550 reads programs or data from a flexible disk 1590 and supplies the read programs or data to the hard disk drive 1540 and to the communication interface 1530 via the RAM 1520. The input/output chip 1570 is connected to a variety of input/output apparatuses via the flexible disk drive 1550, and a parallel port, a serial port, a keyboard port, a mouse port, or the like, for example.

A program executed by the CPU 1505 is supplied by a user by being stored in a recording medium such as the flexible disk 1590, the CD-ROM 1595, or an IC card. The program may be stored in the recording medium either in a decompressed condition or a compressed condition. The program is installed via the recording medium to the hard disk drive 1540, and is read by the RAM 1520 to be executed by the CPU 1505. The program executed by the CPU 1505 causes the image processing apparatus 120 to function as each constituting element of the image processing apparatus 120 explained with reference to FIGS. 1 through 7, and causes the image processing apparatus 170 to function as each constituting element of the image processing apparatus 170 explained with reference to FIGS. 1 through 7.

The programs mentioned above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to a dedicated communication network or the Internet may be used as the storage medium and the programs may be provided to the image processing apparatus 120 and the image processing apparatus 170 via the network. In this way, a computer controlled by a program functions as the image processing apparatus 120 and the image processing apparatus 170.

While the embodiments of the present invention have been described, the technical scope of the invention is not limited to the above described embodiments. It is apparent to persons skilled in the art that various alterations and improvements can be added to the above-described embodiments. It is also apparent from the description of the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image processing system, comprising:
a characteristic region detecting section that detects a characteristic region from an image, including detecting, as a characteristic region, a region including an object that moves in a moving image;
a compressing section that compresses the image by compressing each prescribed partial region, wherein the compressing section compresses an image of a partial region included in the characteristic region by using pixel values of pixels, the number of which is larger than the number of pixels used for compressing an image of a partial region included in a region other than the characteristic region and for obtaining a moving-image constituting image from each moving image; and
an inclusion region identifying section that identifies, as an inclusion region, a collective region of partial regions that include a plurality of characteristic regions in each of a plurality of moving-image constituting images,
wherein the compressing section reference-encodes regions other than the inclusion region in each of the moving-image constituting images; and
the compressing section does not reference-encode the inclusion region in each of the moving-image constituting images.

2. The image processing system according to claim 1, wherein
the compressing section includes a spatial-frequency-component calculating section that calculates a spatial frequency component of each partial region, and the spatial-frequency-component calculating section calculating a spatial frequency component of the partial region included in the characteristic region by using pixel values of pixels, the number of which is larger than the number of pixels used for calculating a spatial frequency component of the region other than the characteristic region.

3. The image processing system according to claim 2, wherein
the compressing section further includes a quantizing section that quantizes the spatial frequency component calculated by the spatial-frequency-component calculating section.

4. The image processing system according to claim 3, wherein
the quantizing section quantizes a spatial frequency component that is calculated for the partial region included in the characteristic region with a quantizing step smaller than a quantizing step used for quantizing a spatial frequency component that is calculated for the partial region included in the region other than the characteristic region.

5. The image processing system according to claim 3, wherein
the compressing section further includes an encoding section that encodes the spatial frequency component quantized by the quantizing section.

6. The image processing system according to claim 2, wherein
the spatial-frequency-component calculating section calculates a discrete cosine transform (DCT) coefficient of each partial region.

7. An image processing system, comprising:
a characteristic region detecting section that detects a characteristic region from an image; and
a compressing section that compresses the image by compressing each prescribed partial region, wherein the compressing section compresses an image of a partial region included in the characteristic region by using pixel values of pixels, the number of which is larger than the number of pixels used for compressing an image of a partial region included in a region other than the characteristic region
the compressing section includes a spatial-frequency-component calculating section that calculates a spatial frequency component of each partial region, and the spatial-frequency-component calculating section calculating a spatial frequency component of the partial region included in the characteristic region by using pixel values of pixels, the number of which is larger than the number of pixels used for calculating a spatial frequency component of the region other than the characteristic region; wherein
the compressing section further includes a quantizing section that quantizes the spatial frequency component calculated by the spatial-frequency-component calculating section;
the quantizing section quantizes a spatial frequency component that is calculated for the partial region included in the characteristic region with a quantizing step smaller than a quantizing step used for quantizing a spatial frequency component that is calculated for the partial region included in the region other than the characteristic region;
the characteristic region detecting section detects the characteristic region from a plurality of moving-image constituting images each of which is the image included in a moving image,
the spatial-frequency-component calculating section calculates a spatial frequency component of the partial region included in the characteristic region of a moving-image constituting image in which the characteristic region is detected from the plurality of the moving-image constituting images, and
the quantizing section quantizes the spatial frequency component that is calculated for the partial region included in the characteristic region with a quantizing step smaller than a quantizing step used for quantizing a spatial frequency component that is calculated for the partial region included in the region other than the characteristic region.

8. The image processing system according to claim 7, wherein
the characteristic region detecting section detects a plurality of characteristic regions that have different characteristic types from the plurality of the moving-image constituting images, and
the quantizing section quantizes a spatial frequency component calculated for a partial region included in each of the plurality of the characteristic regions with a predetermined quantizing step that is determined depending on the characteristic types.

9. The image processing system according to claim 1, further comprising:
a compressed image obtaining section that obtains a compressed image compressed by the compressing section;
an expanding section that decodes the compressed image obtained by the compressed image obtaining section by decoding each partial region; and
a partial-region image enlarging section that enlarges the image of the partial region decoded by the expanding section by an enlargement factor corresponding to the number of the pixels which the compressing section has used for compression.

10. An image processing method, comprising:
   detecting a characteristic region from an image including detecting, as a characteristic region, a region including an object that moves in a moving image;
   compressing the image by compressing each prescribed partial region, wherein an image of a partial region included in the characteristic region is compressed by using pixel values of pixels, the number of which is larger than the number of pixels used for compressing an image of a partial region included in a region other than the characteristic region and for obtaining a moving-image constituting image from each moving image; and
   an inclusion region identifying section that identifies, as an inclusion region, a collective region of partial regions that include a plurality of characteristic regions in each of a plurality of moving-image constituting images,
   wherein the compressing section reference-encodes regions other than the inclusion region in each of the moving-image constituting images; and
   the compressing section does not reference-encode the inclusion region in each of the moving-image constituting images.

11. A non-transitory computer readable medium storing therein a program for an image processing system, the program causing the computer to function as:
   a characteristic region detecting section that detects a characteristic region from an image including detecting, as a characteristic region, a region including an object that moves in a moving image;
   a compressing section that compresses the image by compressing each prescribed partial region, the compressing section compresses an image of a partial region included in the characteristic region by using pixel values of pixels, the number of which is larger than the number of pixels used for compressing an image of a partial region included in a region other than the characteristic region and for obtaining a moving-image constituting image from each moving image; and
   an inclusion region identifying section that identifies, as an inclusion region, a collective region of partial regions that include a plurality of characteristic regions in each of a plurality of moving-image constituting images,
   wherein the compressing section reference-encodes regions other than the inclusion region in each of the moving-image constituting images; and
   the compressing section does not reference-encode the inclusion region in each of the moving-image constituting images.

* * * * *